(12) United States Patent
Gofer et al.

(10) Patent No.: US 8,869,030 B2
(45) Date of Patent: Oct. 21, 2014

(54) HIERARCHICAL REPRESENTATION OF CONTEXTUAL INFORMATION

(75) Inventors: Arie Gofer, Givatayim (IL); Jacob Hecht, Kfar-Hess (IL)

(73) Assignee: Flash Networks Ltd., Herzliya (IL)

(*) Notice: Subject to any disclaimer, the term of this patent is extended or adjusted under 35 U.S.C. 154(b) by 746 days.

(21) Appl. No.: 11/858,195

(22) Filed: Sep. 20, 2007

(65) Prior Publication Data

US 2009/0083675 A1    Mar. 26, 2009

(51) Int. Cl.
*G06F 3/00* (2006.01)
*G06F 9/44* (2006.01)

(52) U.S. Cl.
CPC ... *G06F 8/74* (2013.01); *G06F 8/24* (2013.01); *G06F 8/34* (2013.01)
USPC .......................... 715/713; 715/853

(58) Field of Classification Search
CPC ..... G06F 3/0482; G06F 3/0481; G06F 3/048; G06F 17/2241
USPC ................................. 715/713, 853
See application file for complete search history.

(56) References Cited

U.S. PATENT DOCUMENTS

| | | | | |
|---|---|---|---|---|
| 7,200,816 | B2* | 4/2007 | Falk et al. | 715/762 |
| 7,353,464 | B1* | 4/2008 | Kundu et al. | 715/853 |
| 2002/0156814 | A1* | 10/2002 | Ho | 707/514 |
| 2003/0105771 | A1* | 6/2003 | Tiefenbrun et al. | 707/103 R |
| 2004/0177319 | A1* | 9/2004 | Horn | 715/501.1 |
| 2005/0160359 | A1* | 7/2005 | Falk et al. | 715/513 |
| 2008/0120593 | A1* | 5/2008 | Keren et al. | 717/105 |
| 2009/0063517 | A1* | 3/2009 | Wright et al. | 707/100 |

* cited by examiner

*Primary Examiner* — Shen Shiau
(74) *Attorney, Agent, or Firm* — Fleit Gibbons Gutman Bongini & Bianco PL; Martin Fleit; Paul D. Bianco

(57) ABSTRACT

Method and system enabling a user to select a data element out of a set of available data elements through the use of a hierarchical view (e.g. a tree). Whenever the user needs to choose a data element, the system collects the descriptions of all data elements that are both available and relevant in accordance with the specific use from a set of available data elements through the use of a hierarchical view. The tree represents each entity (data element) as a node and the properties of each entity as sub-nodes under it, possibly grouped into property groups represented as tree nodes. The system hides all implementation aspects of the data structure from the user—selection of the required value causes the underlying system to automatically perform all required actions in order to retrieve, calculate or search for the desired data element.

13 Claims, 4 Drawing Sheets

HIERARCHICAL REPRESENTATION OF CONTEXTUAL INFORMATION

FIELD OF THE INVENTION

The present invention relates generally to software development tools, and more specifically, to hierarchical representation of multiple data elements within a data model.

BACKGROUND OF THE INVENTION

Many development and modeling environments, such as business and policy modeling, software development tools and rules management systems require users to choose data elements to be used in a certain circumstance, from a variety of data elements. These data elements may be selected to be used for different purposes. For example, they may be used within forms with predefined fields to fill-in, as a component within an expression in conditional phrases and so forth.

Each data element may be a discrete data item, a property (or a field) of a complex data entity, or an entire data entity. Any element comprises the element properties which describe the qualitative aspects thereof and element values which relate to the quantitative aspects thereof. The term "element" relates both to the name or another descriptor of the property as shown in the tree and to its underlying value that will be used when this name or descriptor is selected.

Data elements used by a system may originate from different sources including data available locally in the runtime environment, data retrieved from storage, from data base or a calculation that include any data element or elements retrieved from any of the aforementioned data sources The list of available and applicable data element and data entities at a specific point (referred to collectively as "the context") where they are used varies and depends on the nature and type of these data elements.

Some presently available environments present the user with all possible data elements. However, none of these tools take into account the specific context of use, and the relationship between the various data elements.

Therefore, it would be advantageous to have an environment that provides a user with a convenient hierarchical representation of the data entities and elements wherein the relationship representation reflects the relation between the data elements and changes in accordance with the specific context of use.

SUMMARY OF THE INVENTION

The present invention comprises a method and system enabling a user (e.g. software developer) to select a data element from a set of available data elements through the use of a hierarchical view (e.g. a tree). Whenever the user of a computerized system need to choose a data element to be used, the system determines all the data elements that are both available and relevant in accordance with the specific context of use and subsequently present it to the user in a form of a tree (or any other hierarchical structure for that matter).

The tree represents each entity (data element) as a node and the properties of each entity (data element) as sub-nodes under it (potentially grouped under nodes representing property groups). The hierarchical representation also provides access to indirectly accessible data elements such as referenced entities or calculated values. References between two entities are shown as sub nodes, hiding the implementation aspects that may require queries to different data sources to be performed.

According to one aspect of the invention, the user is then free to select any element on the tree in order to get hold of any desired data. Alternatively, the user may navigate through the tree, traversing through different data elements and referenced data elements until he or she finds the appropriate data.

According to a second aspect of the invention, the data description shown in the tree, and that may assist the user in the navigation process may represent data collected from different sources, calculated values, or references for other data entities. All these data elements are shown to the user in a single consolidated view regardless of the data sources used.

According to a third aspect of the invention, the system hides all implementation aspects of the data structure from the user—selection of the required value (data) will cause the underlying system to automatically perform all required actions for retrieval, calculation or search for the desired data element.

According to a fourth aspect of the invention, the disclosed method may be used for on-line systems work (e.g. run-time environment) choosing from real data instances, or for off-line work (design-time environment) specifying the data to be used in runtime.

BRIEF DESCRIPTION OF DRAWINGS

The subject matter regarded as the invention will become more clearly understood in light of the ensuing description of embodiments herein, given by way of example and for purposes of illustrative discussion of the present invention only, with reference to the accompanying drawings (Figures, or simply "FIGS."), wherein.

Figure 1:
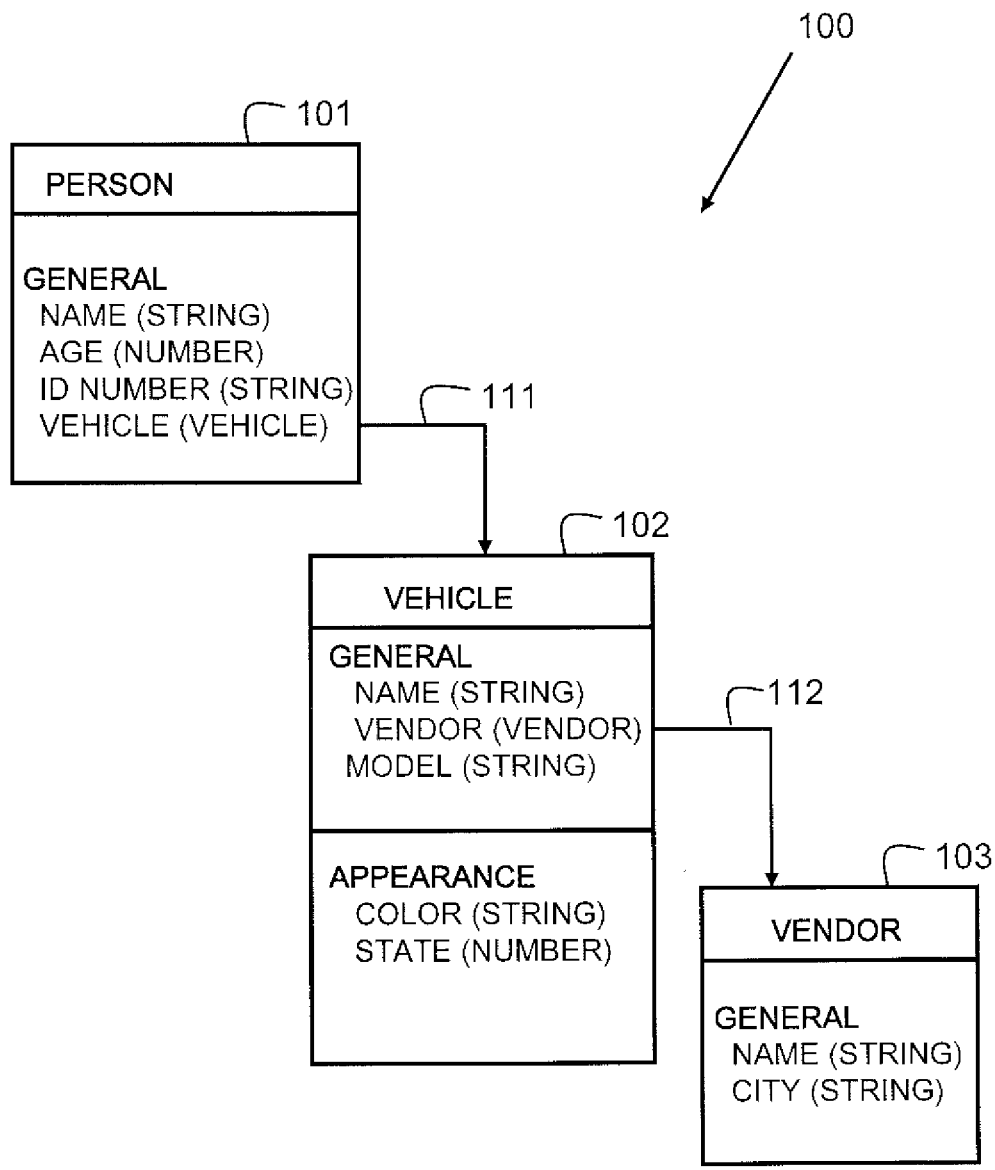
FIG. 1 is a data diagram showing a data model as practiced according to the present invention.

The drawings together with the description make apparent to those skilled in the art how the invention may be embodied in practice.

Further, where considered appropriate, reference numerals may be repeated among the figures to indicate corresponding or analogous elements.

DETAILED DESCRIPTION OF THE INVENTION

FIG. 1 shows a data model 100 that may be used in a specific context and may be applicable by the invention. The data model 100 comprises several data elements (entity types), 101, 102 and 103. Each data element may be connected to another data element via a relationship 111, 112, etc. Specifically, the data element titled PERSON 101 is connected via the relationship VEHICLE 111 to a data element VEHICLE 102 representing a reference between a PERSON entity and a VEHICLE entity (which he owns) in the data repository, which in turn is connected to another data element titled VENDOR 103, via a relationship titled VENDOR 112 representing a reference between a VEHICLE entity and VENDOR entity in the data repository.

Figure 2:
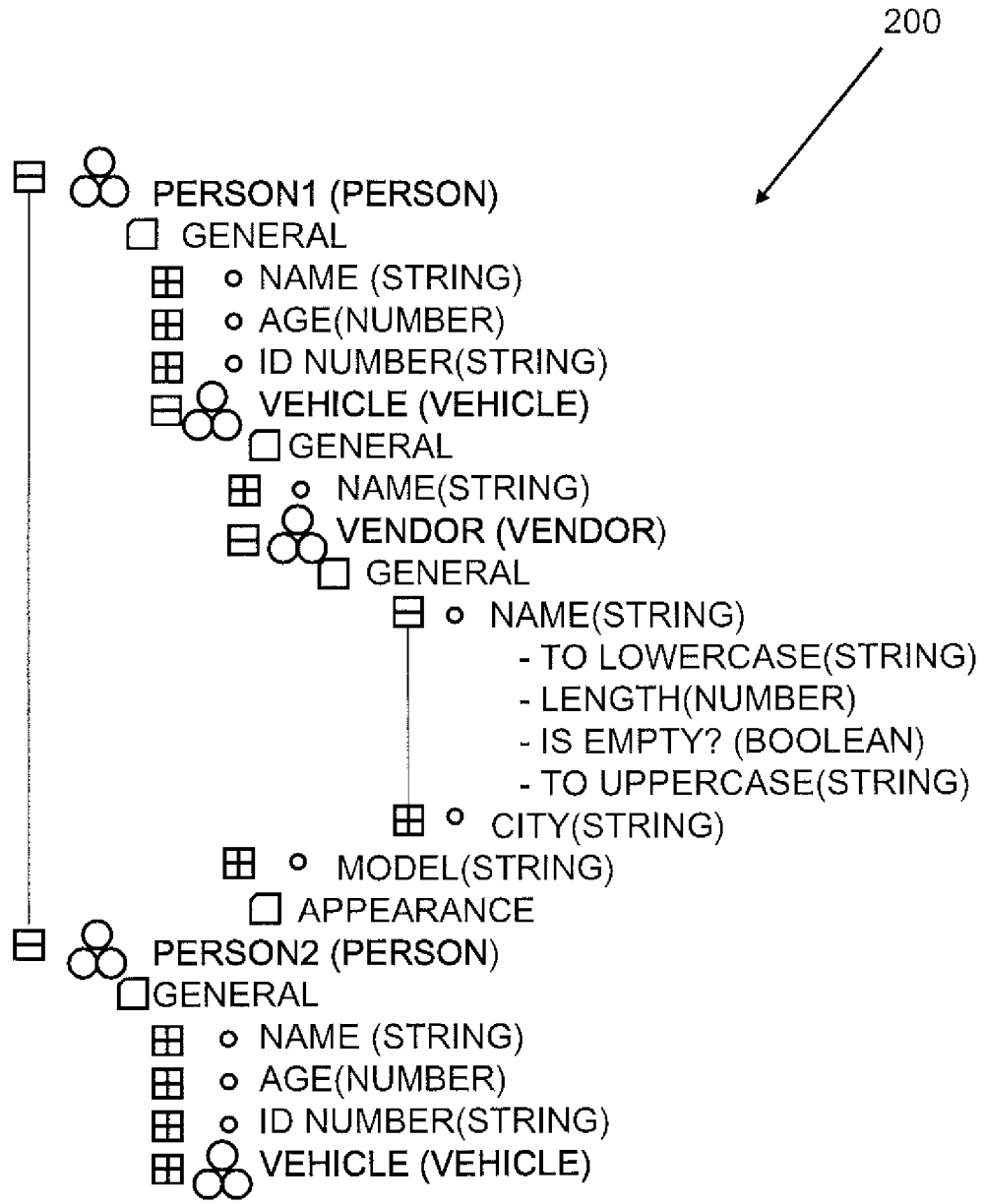
FIG. 2 is a tree diagram showing a hierarchical representation for a possible data representation in a certain context model according to the present invention The context currently includes two entities of type PERSON called PERSON1 and PERSON2 wherein all values can be used in this context.

Upon operation, the user is prompted by the system and method of the present invention to select a string value to be used. For example, in the case the context of use comprises two data elements of PERSON type e.g. PERSON 1 and PERSON 2, a corresponding tree is presented to the user as shown in FIG. 2. This tree is a hierarchical representation of the available and relevant context information at this point.

FIG. 2 shows the corresponding tree 200, as generated by the system and method of the present invention, in accordance with the selected data elements, a selected data model and the present context of use. The tree 200 shows in a hierarchical manner how corresponding data elements (entities) are related. The tree 200 comprises different kinds of data elements. For example, the tree 200 shows PERSON 1 and PERSON 2 which are the data elements available at the context. Upon them, the VEHICLES and the respective VENDORS are shown as sub-tree nodes. The properties (or fields) of each of the entities are shown as nodes, for example: NAME, AGE etc. At the same time other nodes stand for calculations on the property they hung on (e.g. LENGTH under NAME stands for the length of the name).

Figure 2A:
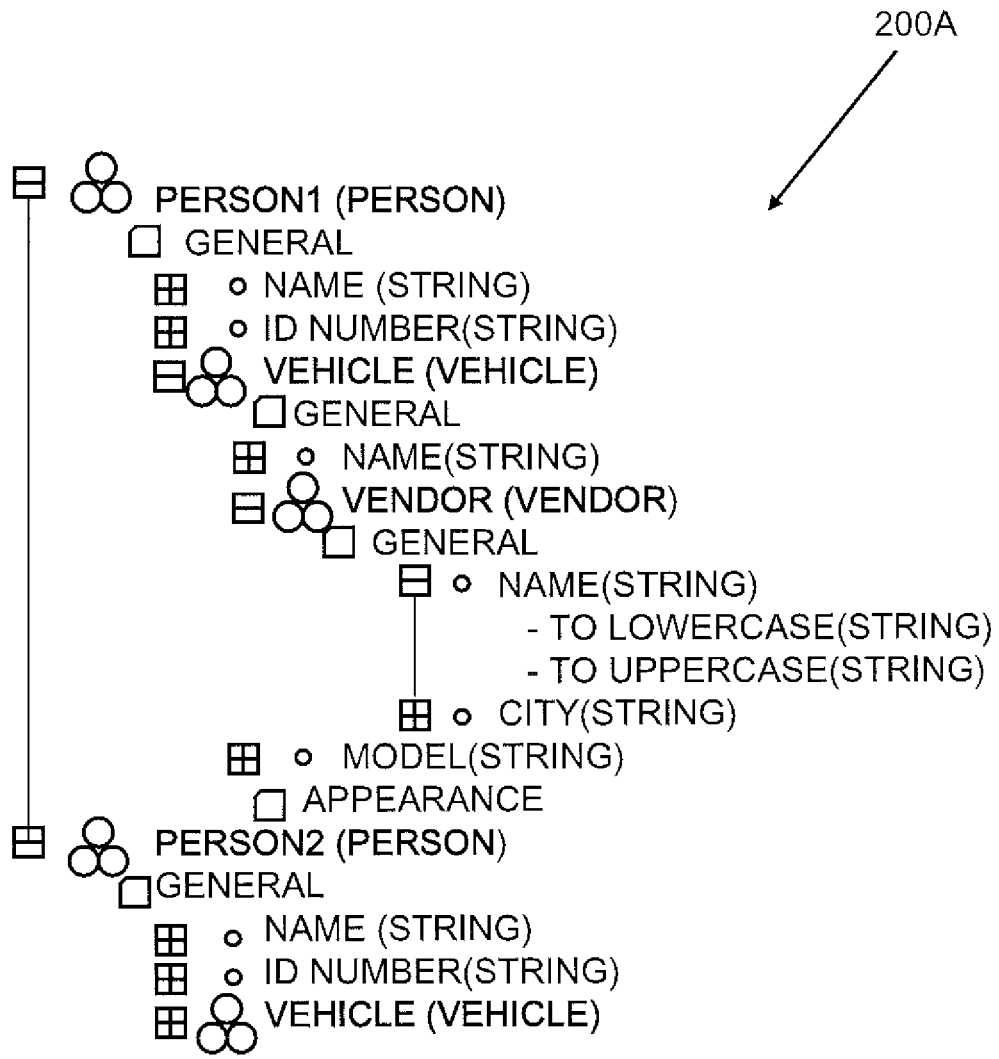
FIG. 2A is a tree diagram showing a hierarchical representation for a possible data representation in a certain context model according to the present invention wherein only the values relevant to a certain context may be used.

FIG. 2A shows the corresponding tree 200A after applying contextual selection upon tree representation 200. For example purposes, the selected context currently includes two entities of type PERSON called PERSON1 and PERSON2 wherein the context pertains that only a string value may be used. Therefore, of all the data elements of the original tree 200 only the STRING values of the two entities of type PERSON titled PERSON1 and PERSON2 are shown in the tree 200A.

Navigation through the trees 200 (or 200A) is then facilitated as the user may see the relations and interplays between the various data elements, their corresponding properties names, in a plurality of levels of abstractions. Standard navigation practices may be applied such as expand/collapse of nodes, help text pop-ups etc.

According to all embodiments of the invention, the method provides user-friendly graphical user interface for non-experienced users for selecting data elements out of a variety of data elements, without requiring the user to be familiar with the data elements names, their origin, their types, their relationships, their suitability for use or their implementation.

Only the relevant and usable elements are shown to the user for visual selection through navigation in a tree structure.

Figure 3:
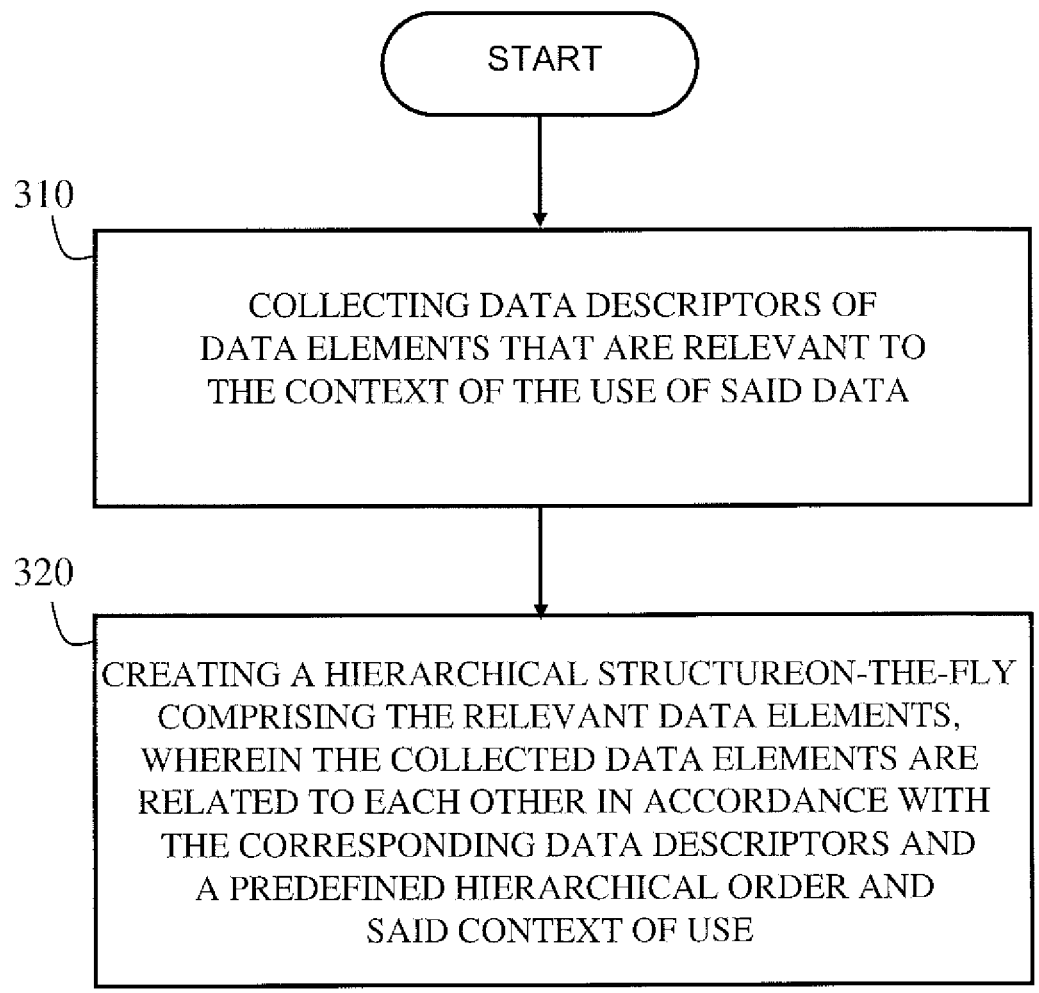
FIG. 3 is a flowchart showing the steps of the method according to some embodiments of the present invention.

FIG. 3 is a flowchart showing the steps according to the method of the present invention. The method presented is a method for managing and displaying data in a hierarchical structure over a graphical user interface, wherein said data comprises data elements each potentially comprising multiple properties. The method comprises the following steps: first, collecting data elements that are relevant to the context of the use of said data, with their applicable properties, wherein said context is user defined 310; and second, creating a hierarchical structure on-the-fly comprising the relevant data elements, wherein the collected data elements are related to each other in accordance with the corresponding data model to create a predefined hierarchical order and said context of use 320.

According to some embodiments of the invention, the method further comprises a step of presenting the hierarchical structure and enabling navigation through the hierarchical structure thus enabling finding and selecting desired data element.

According to some embodiments of the invention the method further comprises a step of presenting the relevant data in a hierarchical structure is preceded by filtering out unusable data elements and retaining only data elements that are relevant for the context of the use of said data.

According to other embodiments of the invention the method further comprises another step of presenting the relevant data elements in a hierarchical structure comprises presenting different levels of data within each data element.

According to other embodiments of the invention the method further comprises another step of enabling a runtime engine to retrieve actual value stored on said data elements in accordance with the hierarchical position of said data elements in said hierarchical structure.

According to other embodiments of the invention enabling a runtime engine to retrieve actual value stored on said data elements is either performed by a database query or is based on a calculation.

In the above description, an embodiment is an example or implementation of the inventions. The various appearances of "one embodiment" "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention can be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the embodiments. Those skilled in the art will envision other possible variations, modifications, and applications that are also within the scope of the invention. Accordingly, the scope of the invention 5 should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A method for managing and displaying data in a hierarchical structure over a graphical user interface, wherein said data comprises data elements each having data properties of different data entities within a development environment, said method comprising the steps of:
    selecting data elements and applicable properties that are relevant to context of each use of said data elements at this point available locally at development environment;
    providing a data model representing interplays between the various collected data elements, their corresponding properties names and levels of abstractions, wherein the data elements are collected from different applications and different data entities; and
    creating a hierarchical structure on-the-fly automatically which is available to the user at development environment providing only the relevant and usable data elements to current usage according to context of each use at this point of the development, specifying the data elements to be used in runtime, which are available locally in runtime environment, wherein the relevant data elements are related to each other in accordance with the corresponding provided data model and are arranged in a hierarchical order according to said provided data model and according to context of each use.

2. The method according to claim 1, further comprising presenting the hierarchical structure and enabling navigation through the hierarchical structure thus enabling finding and selecting desired data element which are applicable to the current programmatic usage.

3. The method according to claim 1, wherein presenting the relevant data in a hierarchical structure is preceded by filtering out unusable data elements and retaining only data elements that are relevant for the context of the use of said data.

4. The method according to claim 1, wherein presenting the relevant data elements in a hierarchical structure comprises presenting different levels of data within each data element.

5. The method according to claim 1, wherein the hierarchy in the tree represents entities references.

6. The method according to claim 1, further comprising enabling a runtime engine to retrieve actual value stored on said data elements in accordance with the hierarchical position of said data elements in said hierarchical structure.

7. The method according to claim 6, wherein enabling a runtime engine to retrieve actual value stored on said data elements is performed by at least one database query.

8. The method according to claim 1, further comprising presenting said properties to a user automatically on a graphical user interface.

9. The method according to claim 6, wherein enabling a runtime engine to retrieve actual value stored on said data elements is based on a calculation.

10. The method according to claim 1, wherein said method is implemented within a software development tool, modeling tool or rule-management tool.

11. The method according to claim 10, wherein said software is flow-based software.

12. The method according to claim 11, wherein said flow-based software is implementing business logic rules.

13. The method according to claim 12, wherein said business logic rules are used across mobile data applications.

* * * * *